United States Patent [19]

Bowers

[11] Patent Number: 5,895,051
[45] Date of Patent: Apr. 20, 1999

[54] NOISE ABATING BEADS ON A RACK SEAL

[75] Inventor: Todd Bowers, Pinckney, Mich.

[73] Assignee: Freudenberg-NOK General Partnership, Plymouth, Mich.

[21] Appl. No.: 08/893,966

[22] Filed: Jul. 16, 1997

[51] Int. Cl.⁶ .................................................. B62O 5/22
[52] U.S. Cl. ........................ 277/346; 180/428; 277/400; 277/407; 277/574
[58] Field of Search ............................. 277/399, 407, 277/411, 422, 916, 346, 574, 944, 573, 400, 582, 347, 349, 585, 560, 579, 572, 154, 414, 418; 180/400, 427, 428, 143, 144

[56] References Cited

U.S. PATENT DOCUMENTS

| | | | |
|---|---|---|---|
| 2,481,430 | 9/1949 | Koller | 277/407 X |
| 3,410,565 | 11/1968 | Williams | 277/400 X |
| 3,735,832 | 5/1973 | Akima | 180/428 |
| 4,195,854 | 4/1980 | Bertin | 277/572 X |
| 4,276,786 | 7/1981 | Langenstein | 74/491 |
| 4,415,166 | 11/1983 | Beia | 277/551 |
| 4,466,623 | 8/1984 | Antonini et al. | 277/507 |
| 4,526,384 | 7/1985 | Riley, Jr. et al. | 277/568 |
| 4,567,973 | 2/1986 | Butz | 277/411 X |
| 4,669,364 | 6/1987 | Komatsu et al. | 92/128 |
| 4,895,391 | 1/1990 | Groat | 280/779 |
| 5,004,248 | 4/1991 | Messenger et al. | 277/573 X |
| 5,024,451 | 6/1991 | Borowski | 277/347 X |
| 5,181,581 | 1/1993 | Engler | 180/428 |
| 5,236,205 | 8/1993 | Chen et al. | 277/944 X |
| 5,287,792 | 2/1994 | Betros et al. | 91/375 R |
| 5,295,698 | 3/1994 | Agarwal et al. | 277/596 |

*Primary Examiner*—Anthony Knight
*Assistant Examiner*—Greg Binda
*Attorney, Agent, or Firm*—Dinnin & Dunn, P.C.

[57] ABSTRACT

A rack seal for use with a rack bushing and seal retainer wherein the rack bushing is made of a thermoplastic material and includes a face with a plurality of cooling cavities. The rack seal includes a body member, an annular sealing face, and a retainer air side which is in constant contact with the thermoplastic bushing cavity face. The rack seal air side surface includes a bead segment. The bead segment has a predetermined height which creates a minimum contact at a full gap with the rack bushing and is compressible to a minimum gap with the rack bushing. The bead segment of the rack seal is in constant contact with the thermoplastic bushing such that any objectionable noises are eliminated during any separation of the rack seal and the thermoplastic bushing.

16 Claims, 2 Drawing Sheets

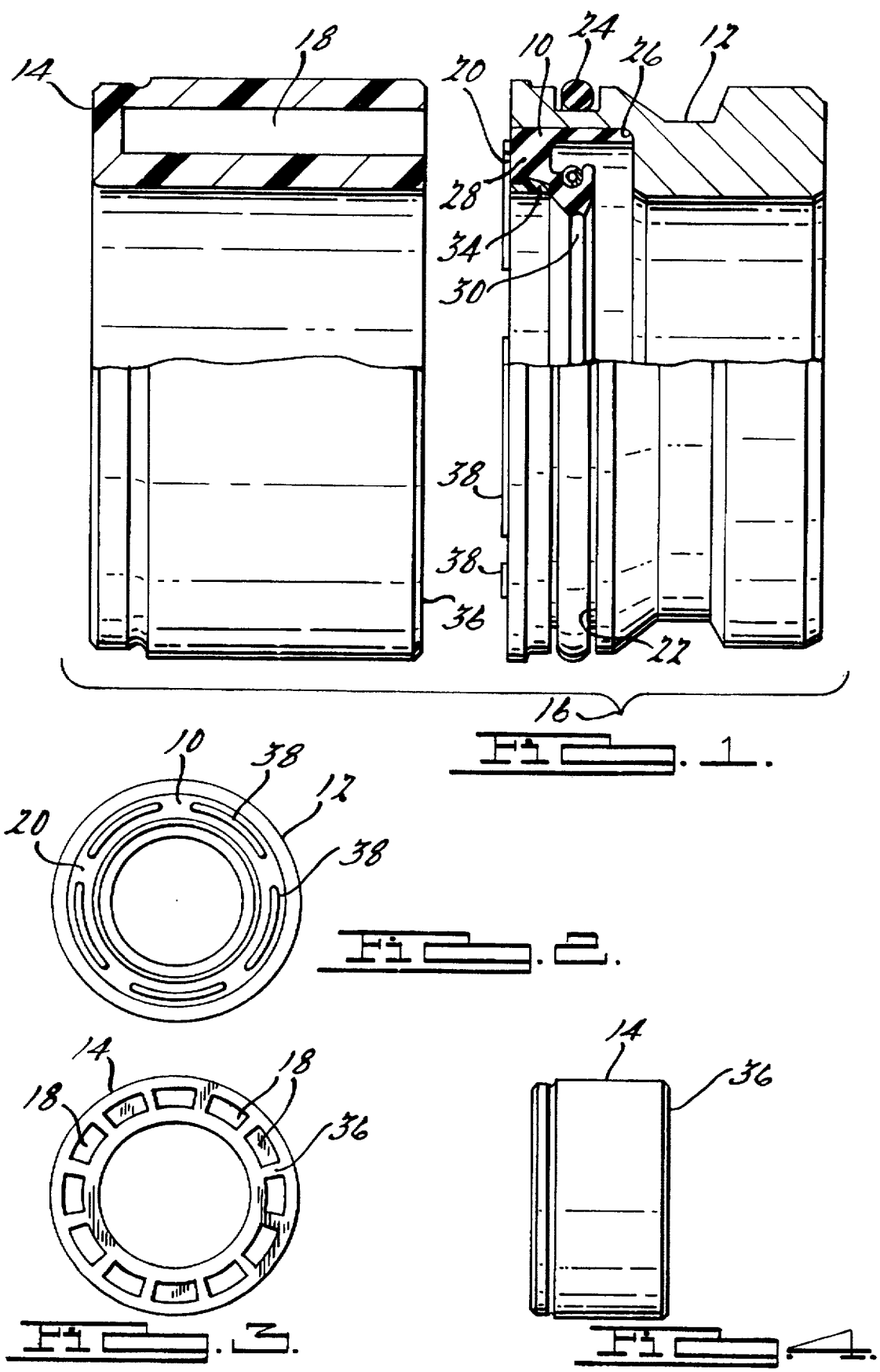

NOISE ABATING BEADS ON A RACK SEAL

BACKGROUND OF THE INVENTION

1. Field of the Invention

The present invention relates to steering rack seals and more particularly to noise reduction beads for use on a steering rack seal.

2. Description of Related Art

The fluid energized rack & pinion steering system on an automobile includes a rack seal which is placed within a rack retainer and is further set against a rack bushing. In prior art systems the rack bushing is made of a metal material and the rack seal with rubber or other composite materials. When the steering system is energized the rack seal is pressed against the rack bushing and a rack seal rotate about each other staying in contact with one another at all times. However, with the push towards lighter vehicles for better gas mileage there has been a move towards replacing metal components of a car with plastic or thermoplastic materials. Such a weight reduction has been proposed by replacing the metal rack bushing with a thermoplastic bushing as a cost and weight saving reduction for the automobile. This creates a thermoplastic and rubber interface between the rack seal and the thermoplastic bushing, because of molding tolerances the thermoplastic bushing creates a gap of approximately 0.5 millimeters to 1 millimeter between the bushing face and the rack seal air side face. During the operation of the steering system the bushing face and the seal face are alternately in contact and separate from one another. This causes difficulties in that as the surfaces separate a noise of an objectionable character is generated and causes concern among the users of the automobiles. Therefore, there is a need to eliminate this noise but still allow implementation of the thermoplastic bushing in order to reduce cost and weight for the automobile manufacturer.

Therefore, there is a need in the art for a noise abating system such that during separation of a thermoplastic bushing and a rack seal an objectionable noise is not made.

SUMMARY OF THE INVENTION

One object of the present invention is to provide a new rack seal with use in a thermoplastic rack bushing and seal retainer.

Another object of the present invention is to provide a rack seal that eliminates the separation of surfaces between a rack bushing and a rack seal.

Yet another object of the present invention is to provide an elastomeric bead which creates proper performance at minimum and maximum gap generated by thermoplastic moldings.

Another object of the present invention is to provide a rack seal that facilitates reduced the cost and weight of an automobile.

Yet another object of the present invention is to reduce manufacturing costs by using existing tooling and validation costs.

To achieve the foregoing objects the rack seal for use with a rack bushing and seal retainer includes a body member, an annular sealing face, and a retainer air side of the rack seal in contact with the rack bushing. The rack seal further includes a bead segment located on the air side surface of the rack seal. The bead segment has a height which creates minimum contact at a full gap with the rack bushing and is also compressible at a minimum gap with the rack bushing.

One advantage of the present invention is that it eliminates a separation of the rack bushing and rack seal surfaces thus eliminating any noise generation as the system cycles.

A further advantage of the present invention is that the elastomer bead segment will perform at minimum and maximum gap which is generated between the thermoplastic rack bushing and the rack seal.

Yet another advantage of the present invention is that the user will reduce the cost and weight by using a thermoplastic bushing.

Yet another advantage of the present invention is that existing tools will not have to be retooled saving money in both tooling and validation costs.

Other objects, features and advantages of the present invention will become apparent from the subsequent description and appended claims, taken in conjunction with the accompanying drawings.

BRIEF DESCRIPTION OF THE DRAWINGS

FIG. 1 shows a plan view of the present invention.

FIG. 2 shows an end view of the rack seal and seal retainer.

FIG. 3 shows an end view of the thermoplastic rack bushing.

FIG. 4 shows a side view of the thermoplastic rack bushing.

Figure 5:
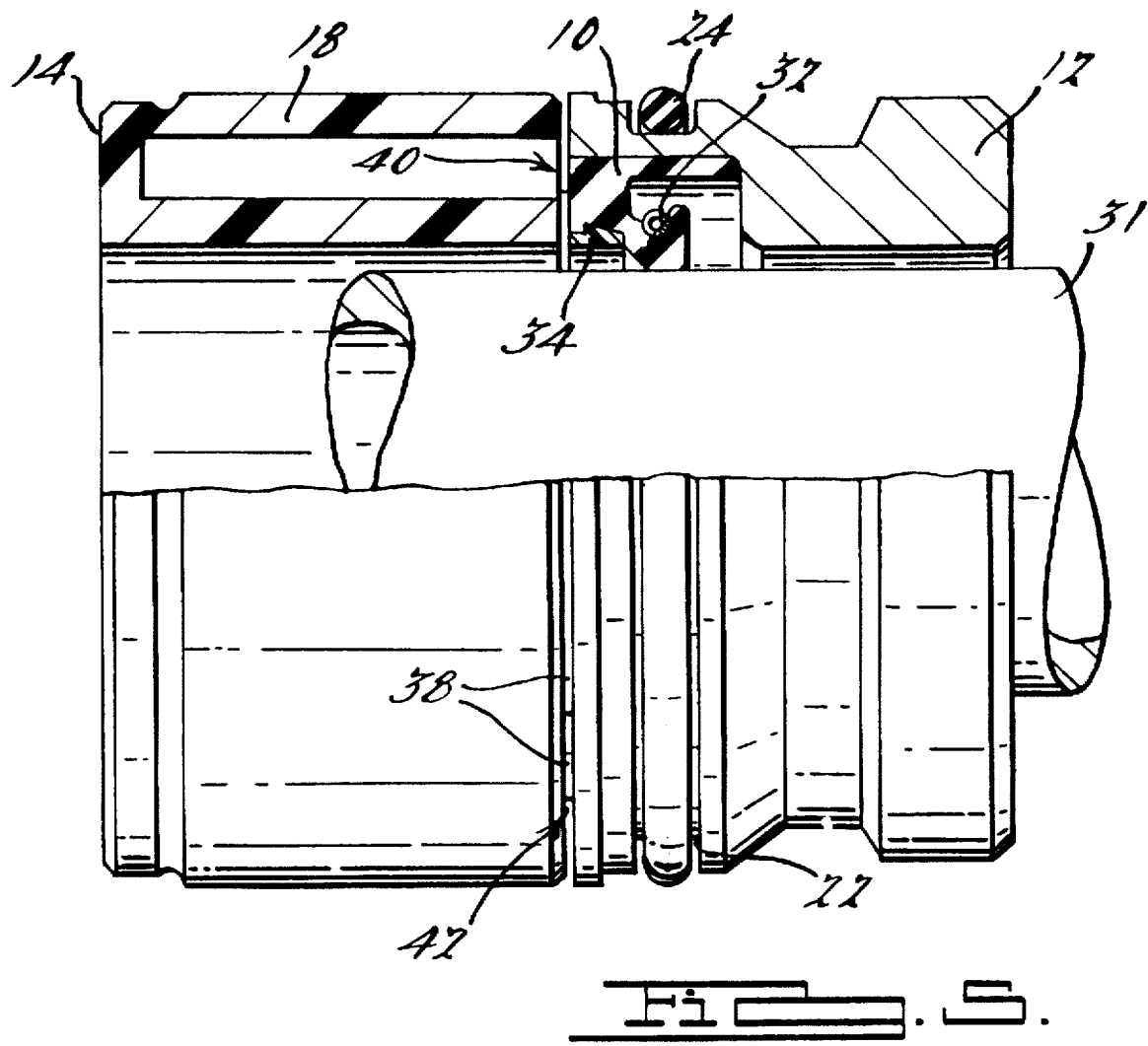
FIG. 5 shows a sectional view of the assembled rack seal system.

BEST MODE OF CARRYING OUT THE INVENTION AND DESCRIPTION OF THE PREFERRED EMBODIMENT(S)

Referring to the drawings, the rack seal 10 for use with a rack seal bushing 14 and seal retainer 12 is shown. The rack seal system 16 as shown in FIG. 1 includes a rack bushing 14 and a seal retainer 12. The rack bushing 14 is preferably made of a thermoplastic material however, it should be noted that any other type of light weight plastic or composite material may be used depending on the needs of the user environment. The thermoplastic bushing 14 generally has a cylindrical shape, however it should be noted any other shape may be used. On one end of the thermoplastic rack bushing 14 are located a plurality of cavities 18 which are created with any commonly known coring process. The cavities 18 are placed along the entire circumferential periphery of the thermoplastic rack bushing 14 in order to cool the bushing 14 during manufacture. The cavities 18 generally have a rectangular shape that are curved to the contours of the circular thermoplastic rack bushing 14. The opposite end of the thermoplastic rack bushing 14 has orifices for locating and securing the thermoplastic rack bushing 14 in its proper position for operation.

In operation the thermoplastic rack bushing 14 is placed opposite and in contact with the air side 20 of the rack seal 10 and seal retainer 12. The seal retainer 12 is preferable made of metal material but it should be noted any other hard ceramic or plastic material may be used and also any type of metal may be used depending on the environment in which the rack seal system 16 will be used. The seal retainer 12 includes a channel 22 around its outer diameter that holds and secures a rubber O-ring seal 24. The seal retainer 12 also includes a seal pocket or seal seat area 26 which securely holds a rack seal 10 in position with relation to the rack bushing 14. The seal pocket 26 generally has a U-shape cross section but matches the circular diameter of the rack seal 10.

The rack seal 10 is secured, by press fitting, within the seal pocket 26 of the seal retainer 12. The rack seal 10 is adjacent to and in constant contact with the thermoplastic bushing 14. The rack seal 10 includes a body member 28, an annular sealing face 30 with a ring spring 32 to urge the sealing face 30 into contact with the surface 31 to be sealed. The seal 10 also includes a plastic or ceramic type ring 34 placed in a U-shaped seat of the body member 28 of the seal 10. The rack seal 10 also includes an air side seal surface or face 20 which comes into physical contact with the thermoplastic bushing face 36 that includes the plurality of cavity members 18. The rack seal side air seal surface 20 includes a plurality of bead segments 38. The bead segments 38 are preferably made of an elastomeric material but it should be noted that any other soft compressible rubber or other plastic material may be used depending on the environment of the rack seal system 16. The sealing beads 38 are placed in a circumferential manner about the surface of the rack seal air side surface face 20. The sealing beads 38 protrude from the seal face 20 such that they eliminate the separation of the rack seal 10 and the thermoplastic bushing 14 with the non-continuous circumferential band of bead segments 38.

When the thermoplastic bushing 14 is molded it creates a tolerance of approximately 0.5 millimeter to 1 millimeter between the bushing 14 and the seal 10 when the rack seal and the thermoplastic bushing are assembled in proper operating position. During system operation of the rack and pinion steering system 16 the rack seal bushing 14 and the rack seal air face side 20 are alternately in contact and then not in contact with one another. As the surfaces of the rack bushing 14 and the rack seal 10 separate it may create an objectionable noise to the user of the automobile or other system using the steering system. As the users of current day automobiles are very sophisticated any noise that is not accounted for must be removed and in order for the thermoplastic bushing 14, which reduces the cost and weight of the automobile, to be kept in the system the objectionable noise has to be removed during operation of the rack seal system 16. The bead segments 38 are designed with predetermined lengths and heights which gives a predetermined volume such that there is always slight or minimum contact when the gap is at its greatest or there is a full gap 42 between the rack bushing 14 and rack seal 10 and the bead segments 38 are also compressible when there is a minimum gap or the gaps are at their smallest 40 between the rack bushing face 36 and the rack seal face 20. This will allow for correct operation of the rack seal system 16 but also will remove any unwanted objectionable noises due to separation of the rack bushing 14 and the rack seal face 20. The arc length or the length of the disrupted or separated bead segments 38 must be long enough to insure that the bead segments 38 bridge, traverse or extend across the cored cavity 18 in the surface of the bushing face 36. The height of the bead segments 38 also must be predetermined such that the total volume of the beads 38 does not over fill or completely close off the cavity or glands 18 during minimum gap between the rack bushing face 36 and the rack seal face 20.

The use of this rack seal system 16 creates a low cost, low weight thermoplastic bushing 14 used in conjunction with a rack seal 10 and rack seal retainer 12 such that existing tools do not have to be reworked and thus costs are saved in tooling and validation. During system operation the rack seal elastomeric bead segments 38 will be in constant contact with the thermoplastic bushing face 36 that includes cooling cavities 18 such that any unwanted and obscene noises will not be generated thus reducing warranty work for the manufacturer of the steering columns.

The present invention has been described in an illustrative manner, it is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise then as specifically described.

What is claimed is:

1. A rack seal system including a rack seal for use in combination with a rack bushing and seal retainer, said rack seal system including:

a body member, an annular sealing face, a retainer air side of said rack seal in contact with the rack bushing;

a bead segment located on a surface of said retainer air side of said seal, said bead segment being discontinuous, said bead segment having a height which creates minimum contact at a maximum gap with the rack bushing and is compressible to a minimum gap with the rack bushing.

2. The rack seal of claim 1 wherein said bead segment is made of a rubber material.

3. The rack seal of claim 1 wherein said bead segment protrudes from said air side surface of said rack seal.

4. The rack seal of claim 1 wherein said bead segment has a length that traverses a cored surface of the rack bushing.

5. The rack seal of claim 4 wherein said bead segment has a volume that resists overfilling of a gap between said rack seal and said rack brushing at said minimum gap.

6. The rack seal of claim 5 wherein said bead segment includes a plurality of bead segments aligned in a circumferential pattern about said air side surface.

7. The rack seal of claim 1 wherein said rack bushing is made of a thermoplastic material.

8. A rack seal system, said system including:

a seal retainer, said retainer having a seal pocket;

a rack bushing having a plurality of cooling cavities, said cooling cavities are opposite of and are in contact with a rack seal secured within said seal pocket;

said rack seal having a plurality of discontinuous bead segments, said bead segments in constant contact with said rack bushing, said bead segments having a predetermined length and height.

9. The rack seal system of claim 8 wherein said rack bushing is made of a thermoplastic material.

10. The rack seal system of claim 9 wherein said height resists overfilling said cavities at a minimum gap.

11. The rack seal system of claim 10 wherein said bead segments create minimum contact with said bushing at a full gap and said bead segments are compressible when at said minimum gap.

12. The rack seal system of claim 8 wherein said bead segments protrude from an air side face.

13. The rack seal system of claim 12 wherein said length enables said bead segments to extend across said cavities on a surface of said bushing.

14. The rack seal system of claim 8 wherein said bead segments eliminate separation of said bushing and said rack seal.

15. The rack seal system of claim 14 wherein said bead segments eliminate noise during operation of the rack seal system.

16. The rack seal system of claim 8 wherein said bead segments are aligned in a circumferential pattern about said air side face.

* * * * *

UNITED STATES PATENT AND TRADEMARK OFFICE
CERTIFICATE OF CORRECTION

PATENT NO. : 5,895,051
DATED : April 20, 1999
INVENTOR(S) : Bowers

It is certified that error appears in the above-identified patent and that said Letters Patent is hereby corrected as shown below:

Column 1,
Line 52, please delete "the" after "reduced"

Column 4,
Line 9, please delete "for use"

Signed and Sealed this

Fourth Day of February, 2003

JAMES E. ROGAN
*Director of the United States Patent and Trademark Office*